Dec. 10, 1963

W. S. FORTUNE 3,114,026

SOLDER REMOVING TOOL

Filed Nov. 5, 1962

WILLIAM S. FORTUNE
INVENTOR.

BY Daniel T. Anderson
Nilsson & Robbins
ATTORNEYS.

United States Patent Office 3,114,026
Patented Dec. 10, 1963

3,114,026
SOLDER REMOVING TOOL
William S. Fortune, 14100 Jouett St., Pacoima, Calif.
Filed Nov. 5, 1962, Ser. No. 235,405
12 Claims. (Cl. 219—26)

This invention relates generally to electric equipment repair and rebuilding and in particular to the removing of molten solder from electrical connections.

It is routinely required in modern electronic manufacturing facilities and particularly in research and development laboratories to remove small electronic components such as resistors, capacitors, transistors and the like from terminal strips or printed circuit boards. Frequently the solder connection is not only the means for securing an electrical connector but is also used to form or secure a structural supporting connection for the component.

Typically the leads of a component are wrapped around the terminal posts and then the wound post is more or less covered with solder. Unless the solder is removed it is then difficult or substantially impossible to unwind the lead from the post and remove the component without incurring a high probability of damaging the circuit board or terminal post or the component itself. Simply to heat the connection and melt the solder does not provide a satisfactory method of removing. Normally the high surface tension of the solder causes it to remain in place on the post even though it is otherwise in immobile state. In some cases the solder can be caused to flow away from the joint by continuing to heat it so that effectively the surface tension of the molten solder is reduced. However, increasing the heat may cause damage to the circuit board or to the component; and if the solder does flow it may flow to an undesired location upon the circuit board. In some cases the solder may be caused to flow back onto the soldering iron with the aid of gravity provided it is possible to place the soldering iron below the connection. But such an orientation is usually extremely difficult or impossible to achieve.

Another technique is to melt the solder and then blow it away while it is still molten. At best this does not remove all of the solder, and it is always apt to splash solder where it is not wanted and to create bits of solder which may at a later time be jarred or vibrated into a position deleterious to the proper operation of the circuit, as, for example, by causing an undesired short circuit.

The problem is inherently aggravated by the fact that in addition to the solder remaining in place even though molten, it solidifies extremely quickly when a cold tool is applied to unwind and remove the lead.

Accordingly it is an object of the present invention to provide a means and method for removing molten solder from objects to which it has become adhered which is not subject to such disadvantages of the prior art.

It is another object to provide such a remover which may be particularly adapted to remove molten solder from electrical connections as on a circuit board or small posts on a terminal strip.

It is another object to provide such a remover which is a small, lightweight, hand-held integral tool.

It is another object to provide such a remover which is simple in construction, rugged, dependable, has a long life and is inexpensive to manufacture.

It is another object to provide such a remover which is easily cleaned and maintained.

It is another object to provide such a remover which may include in the combination of the invention a hot tip for melting the solder to be removed.

It is another object to provide such a remover which does not scatter or splash or otherwise disperse the molten solder.

It is another object to provide such a remover which flash-hardens any remaining trace of solder thereby rendering it into a weak crystalline form so as to minimize its bonding strength.

Briefly, these and other objects are achieved in accordance with one example of the invention in which an elongated thin-walled aluminum cylinder is provided which is approximately ¾" x 4". One end of the cylinder is fitted with a closure including a Teflon tube tip member which extends for approximately 1" outwardly from the cylinder along its axis. The Teflon tip member may be thin-walled and flexible and have an inner diameter of approximately ⅛".

The opposite end of the cylinder is fitted with a second enclosure through which is passed a plunger shaft. Within the cylinder and affixed to the end of the shaft is a piston which makes a sliding air-seal engagement with the inner wall of the cylinder. The external end of the shaft may be fitted with a knob or button.

A spring is placed within the cylinder between the tip end and the piston. When the plunger is urged into the cylinder so that the piston is moved toward the tip end, the spring is compressed; and air is ejected through the Teflon tip member. Thusly the remover is "cocked" until released by a trigger mechanism. When the plunger is released the piston is forced back toward the second closure end, thusly creating a vacuum within the tip end of the cylinder. This vacuum may be used to remove molten solder when the plunger is "cocked," the Teflon tip placed near the solder, and the plunger released. The impulse of air movement causes the solder to be drawn into the aluminum cylinder which may be oiled to preclude further any sticking of the solder to the inner wall of the cylinder.

Further details of these and of other novel features and their principles of operation as well as additional objects and advantages of the invention will become apparent and be best understood from a consideration of the following description taken in connection with the accompanying drawings, which are all presented by way of illustrative example only and in which.

Referring with more particularity to the figures, it is stressed that the details shown are by way of example only and are presented in the cause of providing what is believed to be the most useful and readily understood description of the principles of the invention. The detailed showing is not intended as a limitation upon the scope of the invention which is to be measured by the appended claims forming a part of this specification.

Figure 1:
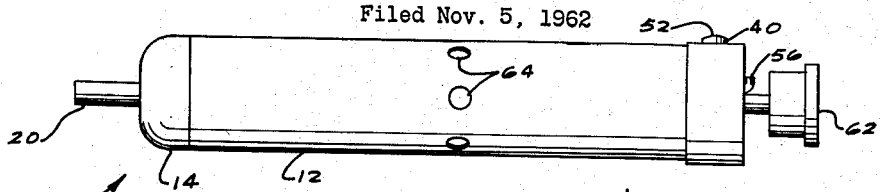
FIG. 1 is an overall elevational view of one embodiment of a solder remover constructed in accordance with the principles of the present invention.
Figure 2:
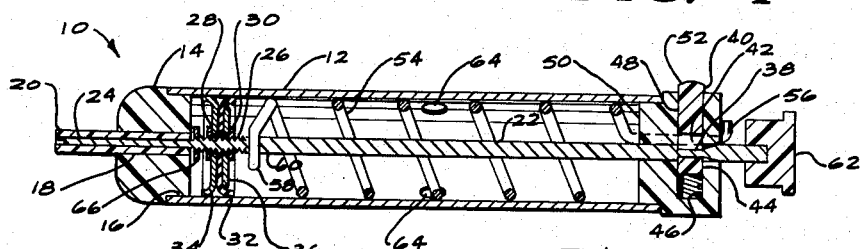
FIG. 2 is a longitudinal sectional view of the structure shown in FIG. 1.

In FIG. 1 and FIG. 2, elevational and sectional views, respectively, illustrate a practical example of one embodiment of the present invention in which a solder remover 10 is shown which includes a tubular body member 12 which may be a section of thin-walled aluminum or plastic tubing or conduit. At the left end of the body member 12, as viewed in the drawing, is disposed a fitting 14 which forms a closure for that end of the tubular body member. The fitting 14, in this example, is provided with a reduced diameter portion 16 which is frictionally secured within the left end of the tubular body member 12. The fitting 14 is centrally relieved to form a bore 18 into which is pressed and secured a thin-walled tubular tip member 20 which forms a communicating passageway between the interior of the body member 12 and the environmental atmosphere. Both the fitting 14 and the tip member 20 are in this example fabricated of heat resistant Teflon. Alternatively, the fitting 14 may be fabricated from clear material such as clear polyethylene so that the operator can see the degree of accumulation of solder. The outer diameter of the fitting 14 may be approximately ⅞" and the inner diameter of the Teflon tip member 20 may be approximately ⅛". The extension of the tip member beyond the fitting 14 may be approximately 1¼". The length of the tubular body member 12 may be approximately 4½".

Disposed within the tubular body member 12 along its axis is shown a plunger shaft 22. The shaft in this example has a reduced diameter tip extension 24 which may protrude substantially through the tubular tip member 20. Axially adjacent the reduced diameter tip extension 24 is, in this example, a threaded portion 26 on which are secured two retaining nuts 28, 30. Retained between the nuts 28, 30 is shown a piston skirt 32 which may be leather or neoprene or a like material. The central portion of the skirt 32 may be stiffened by a pair of discs 34, 36. The left-hand disc 34 may be radially extended to a close proximity to the inner wall of the tubular body member 12 and may be slightly cupped in order to protect the leather skirt 32 from being splashed by molten solder and in order to keep the solder fragments toward the left-hand end of the tubular body member 12.

Toward the right-hand end of the plunger shaft 22 an annular latching notch 38 is relieved therefrom which is automatically engaged by a trigger rod 40 whenever the plunger shaft is displaced to the left and inwardly of the tubular body member 12 as shown in the figure. The trigger rod 40 is relieved to define a passageway 42 through which the plunger shaft 22 passes the lower, block portion 44 of the trigger rod 40 is constantly urged upwardly by a latching string 46 which is retained within the trigger rod 40 transversely relieved through a fitting 50. The latching spring 46 is compressed between the lower block portion 44 and the body of the fitting 50 in a manner to cause the trigger rod 40 to engage and hold a plunger shaft 22 until the exposed button 52 is pressed to compress further the spring 46 and release the lower block portion 44 from the latching notch 38 on the shaft 22.

An energy storing spring 54 is shown with one end 56 protruding through the fitting 50 and retained thereby and with the opposite end 58 retained by its passage through a transverse bore 60 in the plunger shaft 22. When the plunger 22 and the piston skirt 32 are displaced toward the tip end as shown in the figure, the spring 54 is under tension. A button or knob 52 is provided over the external end of the shaft 22 to facilitate such displacement against the resistance of the spring 44. A plurality of air escape and air cushion providing holes 64 are provided through the cylindrical wall of the tubular body member 12. When the piston has flown back beyond the holes 64, it will be cushioned against impact by the air trapped in the rear end of the body member 12.

An ejection nut 66 is shown disposed on the threaded portion 26 of the shaft 22 adjacent to the reduced diameter portion 16 thereof for engaging and ejecting the fitting 14 from the end of the tubular body member 12. Alternatively a shoulder on the shaft may serve this function when the plunger shaft 22 is displaced further to the left, in the figure, than the automatic latching notch 38 would normally permit. This abnormal displacement may be achieved by actuating the trigger rod 40 and by forcefully urging the plunger shaft 22 further to the left against the spring 54; or, as shown the rear edge of the notch 38 may be tapered to permit any displacement to the left without actuating the trigger. This action permits the utilization of one feature of the invention, namely he ready cleaning or exchange of parts of the solder remover 10.

In operation the solder remover 10 is energized or cocked or actuated by depressing the plunger shaft 22 into the interior of the tubular body member 12 until the automatic latching mechanism engages the latching notch 38. This action not only prepares the device for immediate use, but at the same time cleans the thin-walled tubular tip member 20 by passing the reduced diameter portion 16 of the shaft therethrough thusly ejecting any residual fragments of solder from previous use. It may be noted that the reduced diameter tip extension 24 normally extends through the tubular tip member 20 to a point just short of the end of the ladder. This precludes the contact of the tip extension 24 with the molded solder thusly cooling it before it is drawn away.

In use the tubular tip member 20 of the cocked solder remover 10 is placed near to or in contact with the molten solder to be removed. The trigger rod button 52 is then pressed to remove the lower block portion 44 from the latching notch 38 thusly permitting the abrupt return of the spring 54 toward the fitting 50. It may be noted that when the trigger button 52 is first pressed a relatively small flow of air is drawn through the tubular tip member 20; however when the reduced diameter tip extension 24 has been withdrawn fully into the interior of the tubular member 12 an abrupt, very high velocity impulse of air is drawn through the tip. This impulse not only removes the solder in the proximity of the tip 20, as from a terminal post, but also cools the post so quickly as to "crystallize" any remaining solder causing its strength to be considerably reduced and thusly facilitating the remaining step of removing the component from the circuit board.

The size and number of the air escape and air cushion providing holes 64 as well as the spring constant of the spring 54 may be optimized and selected empirically in a manner to shape as desired the distribution of air versus time through the tip 20. As indicated above, the holes 64 not only permit the escape of air in back of the piston skirt 32 but also form a shock absorbing air cushion so that the inertia of the spring and plunger shaft and its connected parts do not cause discomfort to the operator or excessive wear on the parts.

Figure 3:
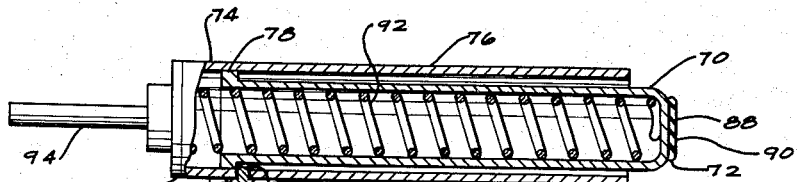
FIG. 3 is a sectional view of an alternative embodiment of the invention.

Referring to FIG. 3 an example of the invention is illustrated in which the plunger and piston assembly consist of a closed end inner tubular member 70 having an exposed closed end 72 and a second open end 74 and which is shown disposed within an outer cylindrical member 76. Disposed radially and axially adjacent to the open end 74 is a piston skirt forming shoulder 78 which forms a sliding air seal with the inner wall of the outer cylindrical member 76. The skirt forming shoulder 78 also forms a latching shoulder or a manual trigger 80. The trigger 80 comprises a lever 82 which when depressed causes the withdrawal, from engagement with the shoulder 78, of a trigger latch 84. The trigger latch 84 is normally biased inwardly by a flat spring member 86. The trigger 80 is preferably made to fit closely about and within a bore 88 through the wall of the outer cylindrical member 76 so as to minimize the undersired entrance of air therethrough.

The exposed closed end 72 of the inner tubular member 70 provides a comfortable cocking or actuating knob 88 to which is applied in this example a rubber pad 90 for increased comfort and for added friction when the device is actuated by pressing the implement against a solid object such as a bench top. The latter is in many applications a preferred method of utilization of the invention since such an actuating technique may be accomplished without changing in any way the hand grasp on the tool. In this example of the invention, energy for the vacuum stroke is stored by means of a spring 92 which is held in compression between the ends of the inner and outer cylinders 70, 76.

A tip assembly 92 is provided which may be similar to that illustrated in the previous figures except that in this example a cleaning tip extension has not been indicated.

Figure 4:
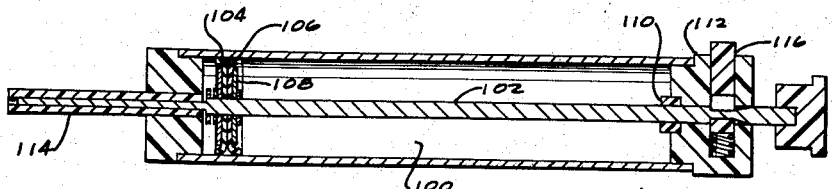
FIG. 4 is a sectional view illustrating an embodiment of the invention which utilizes an evacuated space to store the energy for the vacuum stroke.

Referring to FIG. 4 an example of the invention similar in most of its important aspects to the embodiment illustrated in FIG. 1 and FIG. 2 is illustrated. In the example of FIG. 4 however the energy for the vacuum stroke is stored in an evacuated chamber 100. A plunger shaft 102 is provided to which are attached, at its left hand end as viewed in the drawing, a pair of opposing piston skirts 104, 106 which are retained by a pair of backing discs 108. Thus, when the air has been evacuated from the chamber 100, the outwardly directed piston skirt 104 and an air tight sealing gasket 110 fitted between the shaft 102 and an end closure fitting 112 maintains the chamber in an evacuated state ready to draw air in through the tip member 114 when the trigger 116 is released as in the above examples.

Figure 5:
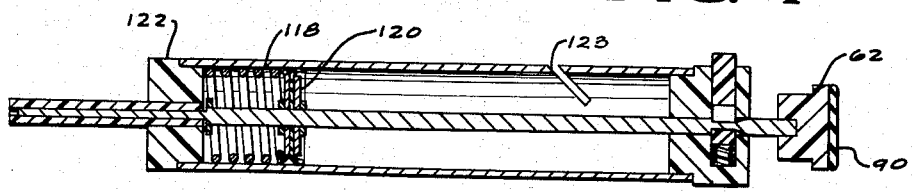
FIG. 5 is a sectional view illustrating an embodiment of the invention which utilizes a compressed spring to store the energy for the vacuum stroke.

Referring to FIG. 5 an example of the invention is illustrated in which the energy storage means for the vacuum stroke is a spring 118 which is held in compression between the piston 120 and the tip end fitting 122. An oblique slot 123, is relieved from the cylindrical side of the body to replace the holes 64. This provides an even less abrupt cushioning of the piston and shaft members. The device as shown is in most other aspects similar to the embodiment depicted in FIG. 1 and FIG. 2. As in FIG. 3 a rubber pad 90 is shown adhered to the plunger knob 62 for additional comfort and for cocking the device by pressing the plunger end against a smooth, rigid object.

Figure 6:
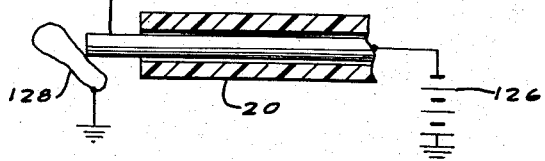
FIG. 6 is a partially sectioned view illustrating the heated tip feature of one embodiment of the invention.

In FIG. 6 an example of the invention is illustrated in which the tip extension 124 of the plunger shaft 22 of FIG. 2 is a resistance element which is heated by virtue of current flowing from a current source 126 which is connected to the body of the solder remover. The opposite terminal of the source 126 is connected electrically to the solder 128 which is to be melted and removed. When the tip 124 is placed in electrical contact with the solder 128, electrical current flows through the resistance tip causing it to become heated and to melt the solder 128. When the solder has been satisfactorily melted the trigger on the solder remover is depressed and the molten solder is drawn through the interior bore of the tubular tip 20 as discussed in the previous examples. In accordance with this example of the invention the operator who is melting and removing solder may perform both operations with a single tool in both hands.

There have thus been disclosed a number of examples and embodiments of a solder remover and method which achieve all the objects and exhibit the advantages set forth hereinabove.

What is claimed is:

1. A solder remover comprising: an elongated tubular body portion having a reduced diameter first end formed by a hollow tip member; plunger means disposed at least in part within said tubular portion and having an actuating portion communicating through a second, opposite end of said tubular portion for displacing said plunger means toward said first end; energy storage means against which work is done in so displacing said plunger means; latching means carried by said body and engageable with said plunger means for holding said plunger means against said energy storage means; trigger means carried by said body for selectively releasing said latching means; and tip self cleaning means including an elongated member carried by said plunger means and extending forwardly thereof into said hollow tip member when said plunger means is disposed toward said first end.

2. A solder remover comprising: a slender tubular body forming an elongated hollow member having a length and cross dimension adapted for holding in one hand and having a substantially constant internal cross-section along a major portion of said length; a tip member forming a restricted air passage disposed at a first end of said elongated hollow member and comprising a tubular extension having an inner cross section which is substantially smaller than that of said elongated hollow member and which forms an air passageway communicating from the interior of said elongated hollow member to the atmosphere externally of said body; a plunger member including a piston portion, said piston portion being disposed effectively within said elongated hollow member to form a sliding air seal therewith, said plunger member extending externally of said elongated hollow member through the second end thereof; means affixed to said plunger member for actuating said piston portion in a manner to displace it toward said first end; energy storage means against which work is done in so displacing said piston portion; latching means connected to said plunger member for holding said piston portion near said first end against the restoring force of said energy storage means; trigger means carried by said body and engageable with said latching means for releasing said latching means, thereby to permit said piston portion to move abruptly away from said first end and to draw a pulse of air from the atmosphere into said elongated hollow member through said tip member; and tip self cleaning means including an elongated member carried by said piston portion and extending therefrom axially toward said first end and into said tubular extension of said tip member when said piston portion is displaced toward said first end.

3. A solder remover comprising: a body including an elongated hollow cylindrical member having first and second ends; a first end fitting comprising a short cylindrical portion and including friction means for removably securing it to said cylindrical member in closure relationship across said first end thereof, said fitting further including a short heat resistant tubular tip member extension, said tip member extension and the remainder of said fitting being centrally relieved to provide a small diameter air passageway communicating between the interior of said cylindrical member and the external atmosphere; a second end fitting comprising a short cylindrical portion affixed in closure relationship across said second end of said cylindrical member, said second end fitting being relieved to define a central passageway therethrough along the axis of said cylindrical member, a plunger shaft extending through said central passageway along the axis of said cylindrical member; a piston member disposed in sliding air seal engagement with the inner wall of said cylindrical member and being affixed to said plunger shaft near its end toward said first end of said cylindrical member; a cleaning rod extension affixed to said plunger shaft and extendible through a major portion of said tip member for cleaning it when said shaft is displaced toward said first end; spring means disposed within said cylindrical member and connected in plunger displacement resisting relationship between said plunger shaft and said body, in a manner whereby displacement of said piston toward said first end requires work to be done against said spring; latching means carried by said shaft; and trigger means carried by said second fitting and selectively releasably engageable with said latching means when said plunger shaft is displaced a predetermined axial distance toward said first end.

4. The invention according to claim 3 in which said plunger shaft further includes fitting engagement means for removing said first fitting from said cylindrical member when said plunger shaft is displaced toward said first end by an axial distance greater than said predetermined distance.

5. The invention according to claim 3 in which said cylindrical member is relieved to define at least one passageway to the external atmosphere forming air escape and air cushion providing means.

6. The invention according to claim 3 in which said spring means is disposed between said second fitting and said piston member in longitudinal tension after said displacement.

7. The invention according to claim 3 in which said spring means is disposed between said first fitting and said piston member in longitudinal compression after said displacement.

8. The invention according to claim 3 in which said rod extension is protrudable beyond said tubular tip member and comprises an electrically heated solder melting tip.

9. The invention according to claim 8 which includes means for maintaining said solder melting tip at a first electrical potential and means for maintaining said solder at a predetermined different potential.

10. A solder remover comprising: a body including an elongated hollow member having a length and cross dimension adapted for holding in one hand and having a substantially constant internal cross-section along a major portion of said length; a tip member forming a restricted air passage disposed at a first end of said elongated hollow member and comprising a tubular extension having an inner cross-section which is substantially smaller than that of said elongated hollow member and which forms an air passageway communicating from the interior of said elongated hollow member to the atmosphere externally of said body; a plunger member including a piston portion, said piston portion being disposed effectively within said elongated hollow member to form a sliding air seal therewith, said plunger member extending externally of said elongated hollow member through the second end thereof; means affixed to said plunger member for actuating said piston portion in a manner to displace it towards said first end; energy storage means against which work is done in so displacing said piston portion; unidirectionally latching means connected to said plunger member for holding said piston portion at a first predetermined axial position near said first end against the restoring force of said energy storage means while permitting further displacement of said plunger member toward said first end; cleaning rod extension means affixed to said plunger member for entering substantially the full length of said tubular extension and thereby cleaning said tubular extension only when said plunger is displaced further in the direction of said first end to a second predetermined axial position; tip ejector means affixed to said plunger member for engaging and ejecting said tip member only when said plunger member is displaced even further in the direction of said first end to a third predetermined axial position; and trigger means carried by said body and engageable with said latching means for releasing said latching means, thereby to permit said piston portion to move abruptly away from said first end and to draw a pulse of air from the atmosphere into said elongated hollow member through said tip member.

11. The invention according to claim 10 in which said body member is foraminated near but at a pre-determined distance from said second end thereof for releasing to the atmosphere air disposed within said body member between said second end thereof and said piston portion during a major portion but not all of the abrupt movement of said piston portion away from said first end, the portion of said body member towards its second end thereby forming an air brake for said abrupt movement.

12. The invention according to claim 10 in which said energy storage means includes a coil spring disposed in said body member between said piston portion and said second end.

References Cited in the file of this patent
UNITED STATES PATENTS

| | | |
|---|---|---|
| 2,609,778 | Bleam et al. | Sept. 9, 1952 |
| 2,826,667 | Brillinger | Mar. 11, 1958 |
| 2,905,799 | De Rugeris | Sept. 22, 1959 |
| 2,960,591 | Brillinger | Nov. 15, 1960 |
| 3,024,343 | Siwakoski | Mar. 6, 1962 |